United States Patent [19]
Davis

[11] 3,718,074
[45] Feb. 27, 1973

[54] COLOR DATA ACQUISITION CAMERA
[76] Inventor: Richard H. Davis, 14406 Fontaine Court, Dale City, Va. 22191
[22] Filed: May 13, 1971
[21] Appl. No.: 142,960

[52] U.S. Cl. .................................................95/1.1
[51] Int. Cl. ..............................................G03b 17/24
[58] Field of Search ...............................95/10 R, 1.1

[56] References Cited

UNITED STATES PATENTS

| 2,322,044 | 6/1943 | McFarlane et al. | 95/10 R UX |
| 2,582,004 | 1/1952 | Capstaff | 95/10 R UX |
| 3,363,525 | 1/1968 | Teeple | 95/1.1 |
| 2,210,610 | 8/1940 | White | 95/1.1 |
| 3,610,119 | 10/1971 | Gerber et al | 95/12 X |

Primary Examiner—Samuel S. Matthews
Assistant Examiner—Kenneth C. Hutchison
Attorney—Harry M. Saragovitz, Edward J. Kelly, Herbert Berl and Glenn S. Ovrevik

[57] ABSTRACT

This invention is a camera for use in making true color photographs which is especially useful in aerial and space photography applications. In accordance with the invention, the camera provides a gray scale reference image for each scene photographed. This reference image is exposed on an edge of the film by means of a light characteristic reference image negative disposed in close proximity to the film surface and fiber optic light transmission means which transmits light energy to the negative such that the edge of the film is exposed through the reference negative. Edge disposition of the reference image enables automatic processing of true color prints from the negative. The reference image may be made with a light source located in or near the camera and/or with light from the natural or artificial scene-illuminating source. A spot representing the density of the scene being photographed may be exposed adjacent to the one or two gray scale images by light passing through the camera lens and an internal lens system.

4 Claims, 3 Drawing Figures

PATENTED FEB 27 1973    3,718,074

INVENTOR
Richard H. Davis

BY
Harry M. Saragovitz
Edward J. Kelly
Herbert Berl
Glenn S. Ovrevik 3,718,074

COLOR DATA ACQUISITION CAMERA

GOVERNMENT USE

The invention described herein may be manufactured and used by or for the Government of the United States of America for governmental purposes without the payment to me of any royalties thereon.

BACKGROUND OF THE INVENTION

Heretofore, professional color printing has involved considerable trial and error experimentation to obtain true color reproduction, that is, true color balance in the print. This trial and error procedure is not only time consuming but it is, of course, unduly costly. In aerial photography applications, especially where a multitude of photographs normally are meshed and matched, the complexity and expense are excessive. The desireability of having a known standard for comparison purposes has been recognized and it is common practice among professional photographers to incorporate some object of known color in each scene. Where possible, photographers frequently take a second photograph of the scene with a large reference placard in the fore-ground in place of the principal subject. The first alternative is not practical in unposed photographs, of course, and may be artistically restrictive in some posed circumstances as a neutral grey, which is the conventional reference color, may not be suitable. The second alternative is highly satisfactory in controlled posed photographs but in unposed action shots there is no assurance that the same lighting conditions exist and thus color reproduction may not be accurate.

It will be appreciated that neither of these alternatives is suitable for use in aerial photography applications and that a means for producing color photographs which enables true color prints and is adaptable to production runs on a series of photographs for use in matching print applications is needed and would be welcomed as a substantial advancement of the art.

SUMMARY OF THE INVENTION

The camera of this invention may be of conventional design with a principal lens system adapted to sensitize a light sensitive film which is selectively disposed in appropriate optical relation with respect the lens, and one or more grey scale reference negatives disposed in close proximity to an edge of the light sensitive film and means for exposing the edge of the film through the grey scale negative by natural light from the illuminating light source and/or from a controlled artificial light source having similar characteristics.

These features and other significant objects of the invention will become apparent from a clear understanding of the invention for which reference is had to the description of several embodiments of the invention and to the drawings wherein.

DESCRIPTION OF THE PREFERRED EMBODIMENTS

Figure 1:
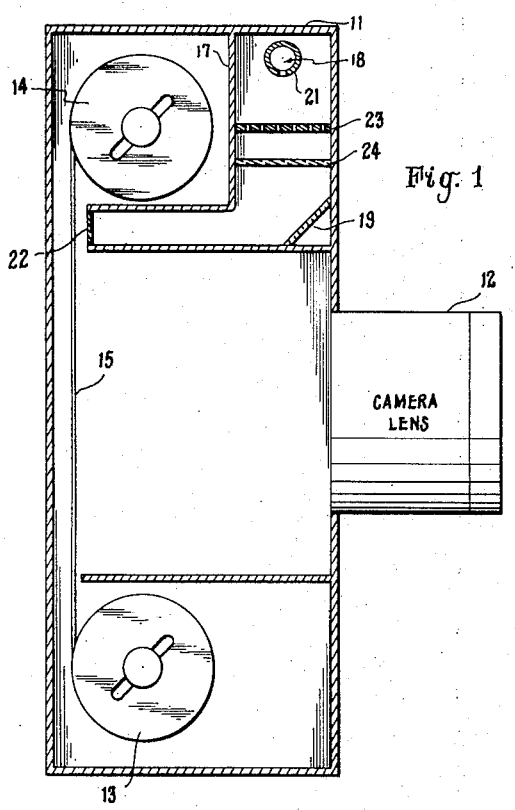
FIG. 1 is a top view cross-section of one embodiment of the camera of this invention where the source of light for the grey scale is an internally disposed light source.

The presentation of FIG. 1 is a top view cross-section of one practical implementation of the invention utilizing a basic camera structure consisting of a light tight housing 11, a principal lens system indicated at 12, a roll film supply means 13, and a roll film takeup means 14 for moving the film 15 which enables exposure of framed portions thereof in selected successive order.

In accordance with the invention, two coadjacent segments of each framed portion of the film are exposed simultaneously, and in this embodiment an internal light partition 16 serves to divide each framed portion of the roll film into two segments, one substantially larger than the other, such that the principal lens system 12 will expose the larger segment. In the embodiment of FIG. 1 the light partition 16 and a second light partition 17 define a second light path within the camera which enables simultaneous exposure of the smaller segment of the film portion by means of an internal light source 18. It will be appreciated, of course, that the light source 18 may be activated by conventional shutter associated switching means, not shown, and may be energized by any conventional energy source, also not shown.

For purposes of illustration convenience, the light source 18 is disposed behind the takeup reel 14. It will be appreciated that this disposition of the light source necessitates a light reflector, such as a mirror surface which may be flat, as indicated at 19, to direct the light beam to the smaller segment of the film portion. Obviously, the light source may be disposed elsewhere, if desired, and if no redirection of the light beam is necessary, the reflector 19 may be omitted.

The light source 18 may be a conventional electronic flash tube which, dependent upon type, may be enclosed in a light tight sleeve, such as shown at 21, with a precise opening to afford a controlled amount of light.

In accordance with the invention, the light beam is directed to the smaller segment of film to be exposed through the reference grey scale, which, preferably, is disposed in close proximity to the film surface, as shown at 22. For purposes of flexibility and economy, a replaceable slit type light reducer, indicated at 23, may be disposed transverse the light beam to permit exposure of the smaller segment of the film in accordance with ASA speed requirement of the film utilized. Obviously, if the camera is intended for use with only one type of film, the light reducer 23 may be permanently installed. Likewise, an adjustable aperture, not shown, similar to the conventional diaphragm used in the principal lens system, may be substituted for the replaceable slit type light reducer, if desired.

It will be appreciated that the artificial light source 18 may require color compensation to match the light characteristic of the light source which illuminates the subject being photographed. For this purpose, a color compensating filter element, indicated at 24, is disposed transverse to the light beam. In the event an artificial light source is utilized to illuminate the subject and the light output of the source 18 is identical to that produced by the illuminating source, the color compensation filter 24 may be eliminated.

Figure 2:
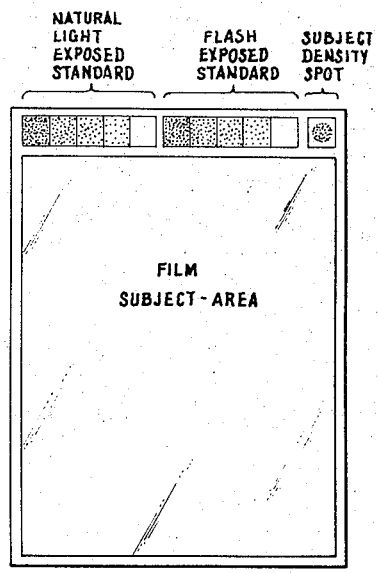
FIG. 2 is a plan view of the segmented film area subject to coincident exposure.

The grey scale reference shown at 22 in FIG. 1 may be graduated in sections as indicated in the FIG. 2 plan view of the segmented film area. It will be appreciated, of course, that dependent upon the application, any number of graduations representative of recognized grey tones, flesh tones, neutral grey, color chips or the like may be incorporated in the camera of this invention.

Figure 3:
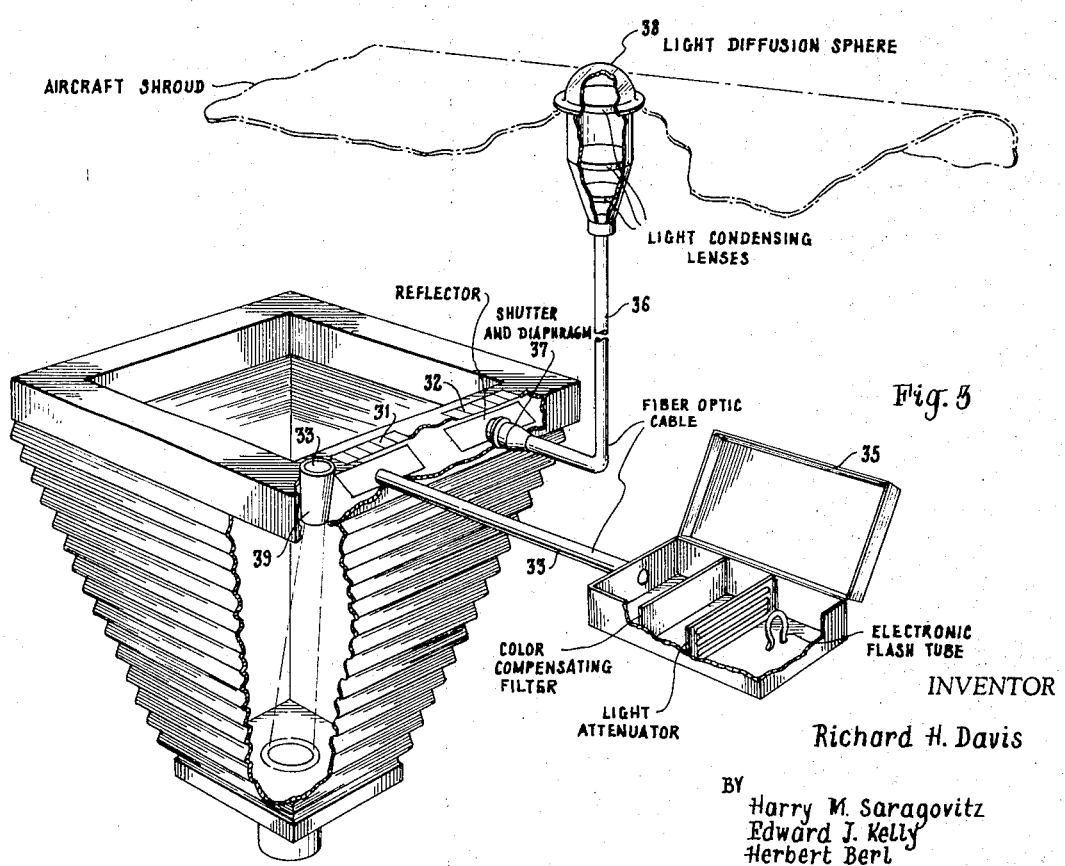
FIG. 3 is a cutaway cross-section view of a second embodiment of the camera of this invention wherein the source of light for the grey scale is the same as that which illuminates the subject to be photographed.

Referring now to FIG. 3 of the drawings, it is within the purview of this invention and may be preferable in selected circumstance to expose the grey scale reference on the edge segment of the film area with the same light source as illuminates the subject being photographed. In the embodiment of FIG. 3, means are provided for exposing two reference grey scales, indicated at 31 and 32 and a density reference indicated at 33. It will be noted that the reference grey scale 31 is subject to a light beam transmitted by a fiber optic light transmission path 33 from an externally disposed artificial light source, indicated at 35, which contains an optical system similar in component arrangement to that shown in the embodiment of FIG. 1.

The reference grey scale 32 also is subject to a light beam transmitted by a fiber optic light pipe, indicated at 36, which includes a shutter and a diaphragm unit, indicated at 37, which is energized by conventional means, not shown, simultaneous with energization of the shutter and diaphragm unit of the principal lens system of the camera, also not shown in detail. In this embodiment the light pipe 36 interconnects the camera with a light responsive element disposed to receive the same light illumination as is incident upon the subject being photographed.

In a typical aerial photography application, the light responsive unit may be mounted in the aircraft shroud with a light diffusion sphere, indicated at 38, exposed to the sun which illuminates the earth surface being photographed. Light entering the light diffusion sphere 38 is processed through an optical system of the condensing lens variety to enter the light pipe 36.

Likewise, the density reference spot 33 may be exposed by the light reflected from the subject being photographed by means of an internally disposed lens system, indicated in general outline at 39, which is disposed to utilize a portion of the light entering the principal lens system 12. It will be appreciated that any conventional lens system suitable for disposition within the camera which does not unduly disturb the operation of the principal lens system may be utilized in this invention. Likewise, a light pipe may be utilized to direct a portion of the light energy to the density reference 33 and to expose same coincident with exposure of the larger segment of the framed film portion.

While the invention has been described in relation to two illustrated embodiments, FIG. 1 and FIG. 3, suitable for use in standard artificial light applications and aerial photography application respectively, it will be appreciated that modifications of the illustrated embodiments of the invention for these or other applications are within the purview of this disclosure.

I claim:

1. A color data acquisition camera having a principal lens system adapted to produce a framed record of an event on a photosensitive color film surface comprising a principal lens system adapted to expose a framed first segment area on said photosensitive film and a light characteristic reference image means adapted to produce a light characteristic reference image upon a second segment area of said photosensitive film coadjacent one edge of said framed first segment area, said reference image means being a color reference means of the gray scale reference variety, said reference image means including a light characteristic reference image negative disposed in close proximity and in parallel relation to said second segment area of said photosensitive film and means for exposing said second segment area through said reference image negative coincident in time with exposure of said first segment area, said means for exposing said second segment area including an artificial light source internally disposed within said camera and light transmission path means adapted to conduct the light output thereof to said color reference image means.

2. A color data acquisition camera having a principal lens system adapted to produce a framed record of an event on a photosensitive color film surface comprising a principal lens system adapted to expose a framed first segment area on said photosensitive film and a light characteristic reference image means adapted to produce a light characteristic reference image upon a second segment area of said photosensitive film coadjacent one edge of said framed first segment area, said reference image means being a color reference means of the gray scale reference variety, said reference image means including a light characteristic reference image negative disposed in close proximity and in parallel relation to said second segment area of said photosensitive film and means for exposing said second segment area through said reference image negative coincident in time with exposure of said first segment area, said means for exposing said second segment area including an artificial light source externally disposed with respect to said camera and fiber optic light transmission path means adapted to conduct the light output thereof to said color reference image means.

3. A color data acquisition camera having a principal lens system adapted to produce a framed record of an event on a photosensitive color film surface comprising a principal lens system adapted to expose a framed first segment area on said photosensitive film and a light characteristic reference image means adapted to produce a light characteristic reference image upon a second segment area of said photosensitive film coadjacent one edge of said framed first segment area, said reference image means including a light characteristic reference image negative disposed in close proximity and in parallel relation to said second segment area of said photosensitive film and means for exposing said second segment area through said reference image negative coincident in time with exposure of said first segment area, said means for exposing said second segment area including fiber optic light transmission means adapted to expose said second segment area to substantially the same light energy as is incident upon the event being recorded.

4. A color data acquisition camera having a principal lens system adapted to produce a framed record of an event on a photosensitive color film surface comprising a principal lens system adapted to expose a framed first segment area on said photosensitive film and a light characteristic reference image means adapted to produce a light characteristic reference image upon a second segment area of said photosensitive film coadjacent one edge of said framed first segment area, said reference image means being a light density reference image means, said reference image means including a light characteristic reference image negative disposed in close proximity and in parallel relation to said second segment area of said photosensitive film and means for exposing said second segment area through said reference image negative coincident in time with exposure of said first segment area, said means for exposing said second segment area including fiber optic light transmission means adapted to expose said second segment area to light energy reflected from the event being recorded.

* * * * *